United States Patent [19]

Senn et al.

[11] Patent Number: 5,286,817
[45] Date of Patent: Feb. 15, 1994

[54] POLY(ARYLENE SULFIDE)/POLY(ARYLENE SULFIDE SULFONE) BLOCK COPOLYMERS AND PREPARATION THEREOF

[75] Inventors: Dwayne R. Senn, Bartlesville, Okla.; Carlton E. Ash, Sugarland, Tex.

[73] Assignee: Phillips Petroleum Company, Bartlesville, Okla.

[21] Appl. No.: 26,958

[22] Filed: Mar. 5, 1993

[51] Int. Cl.$^5$ .............................................. C08G 75/14
[52] U.S. Cl. .................................. 525/537; 525/536; 525/906; 528/388
[58] Field of Search ...................... 525/537, 536, 906; 528/388

[56] References Cited

U.S. PATENT DOCUMENTS

| | | | |
|---|---|---|---|
| 4,301,274 | 11/1981 | Campbell | 528/388 |
| 4,663,431 | 5/1987 | Fujii et al. | 528/388 |
| 4,734,470 | 3/1988 | Kawabata et al. | 525/437 |
| 4,929,665 | 5/1990 | Inoue et al. | 525/537 |
| 4,960,841 | 10/1990 | Kawabata et al. | 525/537 |
| 5,145,946 | 9/1992 | Fujii et al. | 528/388 |

FOREIGN PATENT DOCUMENTS 209925  8/1990  Japan .......................................... 75/2

*Primary Examiner*—John C. Bleutge
*Assistant Examiner*—Helen F. Lee
*Attorney, Agent, or Firm*—Marianne H. Michel

[57] ABSTRACT

A process is provided for preparing poly(arylene sulfide)/poly(arylene sulfide sulfone) block copolymer comprising: contacting poly(arylene sulfide) prepolymer, a dihaloaromatic sulfone, a sulfur source, and a polar organic compound under polymerization conditions, wherein said prepolymer is prepared by contacting a dihaloaromatic compound, a phenolic compound, a polar organic compound, and a sulfur source under polymerization conditions.

20 Claims, No Drawings

POLY(ARYLENE SULFIDE)/POLY(ARYLENE SULFIDE SULFONE) BLOCK COPOLYMERS AND PREPARATION THEREOF

BACKGROUND OF THE INVENTION

This invention relates to the preparation of poly(arylene sulfide/poly(arylene sulfide sulfone) block copolymers and the block copolymers thus produced.

Poly(arylene sulfide)s are important engineering thermoplastics that are highly crystalline and rigid, and exhibit good heat and chemical resistance. They are of commercial interest for film, fiber, moldings, and composite applications.

Poly(arylene sulfide sulfone)s are amorphous polymers and exhibit good mechanical properties relating to toughness, such as impact strength and flexibility, and are useful in molding in such areas as electrical components, wire coatings, automotive parts, and the like.

It would be desirable to produce a polymer composition which exhibits the advantages of both poly(arylene sulfide)s and poly(arylene sulfide sulfone)s, i.e. the flexibility and toughness of an amorphous material, while maintaining the chemical resistance and rigidity of a crystalline material.

SUMMARY OF THE INVENTION

Objects of the present invention are, therefore, to provide a process for preparing poly(arylene sulfide)/poly(arylene sulfide sulfone) block copolymers and the block copolymers thus produced.

In accordance with this invention, a process for preparing poly(arylene sulfide)/poly(arylene sulfide sulfone) block copolymer comprises contacting poly(arylene sulfide) prepolymer and at least one dihaloaromatic sulfone, a sulfur source, and a polar organic compound under polymerization conditions. The poly(arylene sulfide) prepolymer is prepared by contacting at least one dihaloaromatic compound, a phenolic compound, a polar organic compound, and a sulfur source under polymerization conditions. In accordance with another aspect of this invention, there is provided block copolymer produced by the above described process.

DETAILED DESCRIPTION OF THE INVENTION

Poly(arylene sulfide) prepolymer is prepared by contacting at least one dihaloaromatic compound, a phenolic compound, a polar organic compound, and a sulfur source under polymerization conditions. The prepolymer is then contacted with at least one dihaloaromatic sulfone, a sulfur source, and a polar organic compound to form a block copolymer.

The dihaloaromatic compounds which can be employed in the preparation of the poly(arylene sulfide) prepolymer are represented by the formula:

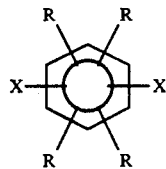

wherein each X is independently selected from the group consisting of fluorine, chlorine, bromine, and iodine, and each R is independently selected from the group consisting of hydrogen and hydrocarbyl in which the hydrocarbyl can be alkyl, cycloalkyl, and aryl radical or combination thereof such as alkaryl, aralkyl, and the like, the total number of carbon atoms in each molecule being within the range of 6 to 24. While the halogen atoms can be in any position in the dihaloaromatic compound, it is preferred to employ p-dihalobenzenes as the dihaloaromatic compound.

Examples of some dihaloaromatic compounds which can be employed in the process of this invention include p-dichlorobenzene, p-dibromobenzene, p-diiodobenzene, 1-bromo-4-chlorobenzene, 1-chloro-4-iodobenzene, 1-bromo-4-iodobenzene, 2,5-dichlorotoluene, 2,5-dichloro-p-xylene, m-dichlorobenzene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 2-octadecyl-1,4-diiodobenzene, 4-bromo-1-chloro-5-phenylbenzene, 1,4-dibromo-2-(p-tolyl)benzene, 2-benzyl-1,4-dichlorobenzene, 1-octyl-4-(3-methylcyclopentyl)-2,5-dichlorobenzene, and the like, and mixtures thereof. The preferred dihaloaromatic compound for use in this invention is p-dichlorobenzene due to availability and effectiveness.

Generally, in preparing the poly(arylene sulfide) prepolymers, the amount of dihaloaromatic compound employed is in the range of about 0.7 to about 2.0 moles per mole of sulfur source and preferably from 0.9 to 1.3.

The phenolic compounds which can be employed in the preparation of the prepolymer are represented by the formula:

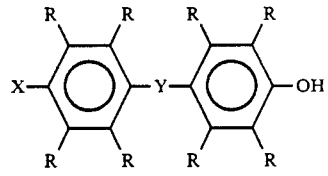

wherein Y is selected from the group consisting of —SO₂— and —CO—; X is selected from the group consisting of hydroxyl, chlorine, bromine, fluorine, and iodine; and each R is independently selected from the group consisting of hydrogen and hydrocarbyl in which the hydrocarbyl can be alkyl, cycloalkyl, and aryl radical or combination thereof such as alkaryl, aralkyl, and the like, the total number of carbon atoms in each molecule being within the range of 12 to 24.

Examples of suitable phenolic compounds containing a sulfone group include bis(4,4'-hydroxyphenyl)sulfone; 4-chloro-4'-hydroxydiphenylsulfone; bis(2-methyl-4-phenol)sulfone; bis(2,5-diethyl-4-hydroxyphenyl)sulfone; bis(3-isopropyl-4-hydroxyphenyl)sulfone; bis(2,5-dipropyl-4-hydroxyphenyl)sulfone; bis(2-butyl-4-hydroxyphenyl)sulfone; and mixtures thereof.

Examples of suitable phenolic compounds containing a benzophenone group include 4,4'-dihydroxybenzophenone (DCBP); 4-chloro-4'-hydroxybenzophenone (CHBP); 4-bromo-4'-hydroxybenzophenone; 4-iodo-4'-hydroxybenzophenone; 4-fluoro-4'-hydroxybenzophenone; and mixtures thereof.

In preparing the poly(arylene sulfide) prepolymer, the phenolic compound is generally present in the amount in the range of from about 0.001 to about 1 moles per mole of sulfur source, and preferable from 0.005 to 1 moles per mole of sulfur source.

The sulfur source which is typically used in preparing the poly(arylene sulfide) prepolymer is an alkali metal sulfide or an alkali metal hydrosulfide. Examples of sulfur sources that can be employed in the preparation of the poly(arylene sulfide) prepolymer include lithium sulfide, sodium sulfide, potassium sulfide, rubidium sulfide, cesium sulfide, lithium hydrosulfide, sodium hydrosulfide, potassium hydrosulfide, rubidium hydrosulfide, cesium hydrosulfide, and mixtures thereof. The alkali metal sulfide can be used in anhydrous form, or preferably as a hydrate, or as an aqueous mixture. Sodium sulfide or sodium hydrosulfide are preferred.

When alkali metal hydrosulfides are employed, it is preferable that a base is present. Suitable bases include alkali metal hydroxides, alkali metal carbonates and mixtures thereof. Examples of bases which can be employed include lithium hydroxide, sodium hydroxide, potassium hydroxide, sodium carbonate, potassium carbonate, rubidium carbonate, cesium carbonate and mixtures thereof. Sodium hydroxide or sodium carbonate are preferred.

If a base is employed, the moles of base per mole of alkali metal hydrosulfide is generally in the range of from about 0.5 to about 4.0 moles of base per mole of sulfur source and preferably from 0.5 to 2.0 moles of base per mole of sulfur source.

The polar organic compounds used in preparing the poly(arylene sulfide) prepolymer should be substantially liquid at the reaction temperatures and pressures employed. The polar organic compounds can be cyclic or acyclic and generally have 1 to 18 carbon atoms per molecule. Suitable polar organic compounds include organic amides, lactams, ureas and sulfones such as formamide, acetamide, N-methylformamide, N,N'-dimethylformamide, N,N'-dimethylacetamide, N-ethylproionamide N,N'-dipropylbutyramide, 2-pyrrolidone, N-methyl-2-pyrrolidone (NMP), ε-caprolactam, N-methyl-ε-caprolactam, N,N'-ethylenedi-2-pyrrolidone, hexamethylphosphoramide, tetramethylurea, sulfolane, diphenyl sulfone, and the like and mixtures thereof. Amid(-s are preferred, and N-methyl-2-pyrrolidone is especially preferred.

The moles of polar organic compound per mole of sulfur source can vary broadly, generally from about 1 to about 24, preferably from 2 to 16, and most preferably from 2 to 12.

Optionally an alkali metal carboxylate can be employed in preparing the poly(arylene sulfide) prepolymer. The presence of an alkali metal carboxylate generally results in an poly(arylene sulfide sulfone) polymer of higher molecular weight than polymers prepared in the absence of alkali metal carboxylate.

Alkali metal carboxylates that can be employed in the preparation of the prepolymer are represented by the formula $R(CO_2M)_m$ where R is a hydrocarbyl radical selected from alkyl, cycloalkyl, aryl, and alkaryl, said hydrocarbyl radical having 1 to 20 carbon atoms, M is an alkali metal selected from the group consisting of lithium, sodium, potassium, rubidium, and cesium, and m is 1 or 2. Preferably, R is an alkyl radical having 1 to 6 carbon atoms, or a phenyl radical, and M is lithium or sodium. If desired, the alkali metal carboxylate can be employed as a hydrate or as a solution or dispersion in water.

Examples of some alkali metal carboxylates which can be employed in the preparation of the poly(arylene sulfide) prepolymer include lithium acetate, sodium acetate, potassium acetate, lithium propionate, sodium propionate, lithium 2-methylpropionate, rubidium butyrate, lithium valerate, sodium valerate, cesium hexanoate, lithium heptarioate, lithium 2-methyloctanoate, potassium dodecanoate, rubidium 4-etbyltetradecanoate, sodium octadecanoate, sodium heneicosanoate, lithium cyclohexane carboxylate, cesium cyclododecane carboxylate, sodium 3-methylcyclopentane carboxylate, potassium cyclohexylacetate, potassium benzoate, lithium benzoate, sodium benzoate, potassium m-toluate, lithium pbenylacetate, sodium 4-phenylcyclohexane carboxylate, potassium p-tolylacetate, lithium 4-ethylcyclohexylacetate, sodium malonate, sodium glutarate, sodium phthalate, and mixtures thereof. The carboxylate can be prepared in situ by the reaction of the corresponding carboxylic acid with at least one alkali metal hydroxide. The presently preferred alkali metal carboxylate is sodium acetate because of its effectiveness and commercial availability.

When employed in preparing the prepolymer, the moles of alkali metal carboxylate per mole of sulfur source can vary broadly, generally in the range of from about 0.05 to about 4, preferably from about 0.1 to about 2, and most preferably from 0.15 to 1.5.

Although the reaction temperature at which the prepolymerization is conducted can vary over a considerable range, generally it will be within the range of from about from 150° C. to about 350° C., and preferably from 175° C. to 275° C. The reaction time can vary widely, depending in part on the reaction temperature, but generally will be within the range of from about 10 minutes to about 72 hours, preferably from 1 hour to 8 hours. The pressure will generally be within the range of about 0 psig to about 300 psig (0–2.1 MPa), preferably 100 psig to about 250 psig (0.7–1.7 MPa).

The poly(arylene sulfide) prepolymer can be separated from the reaction mixture or the prepolymer and reaction mixture can be retained in the reactor and subsequently contacted with the dihaloaromatic sulfone, sulfur source and polar organic compound. If the poly(arylene sulfide) prepolymer is separated from the reaction mixture, any method known to those of ordinary skill in the art can be employed. One suitable method employs the addition of a separation agent such as water, in order to separate the polymer from the polar organic compound and non-polymeric liquid components and unconsumed reactants. The prepolymer can then be washed with water and optionally water-miscible solvents such as acetone or methanol in order to remove impurities and by-product salts.

Dihaloaromatic sulfones employed in the preparation of the poly(arylene sulfide)/poly(arylene sulfide sulfone) block copolymer can be represented by the formula:

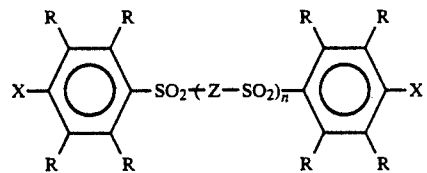

where n is 0 or 1, preferably 0; each X is independently selected from the group consisting of fluorine, chlorine, bromine, and iodine; and each R is independently selected from the group consisting of hydrogen and an alkyl radical having 1 to 4 carbon atoms; and Z is a divalent radical selected from the group consisting of

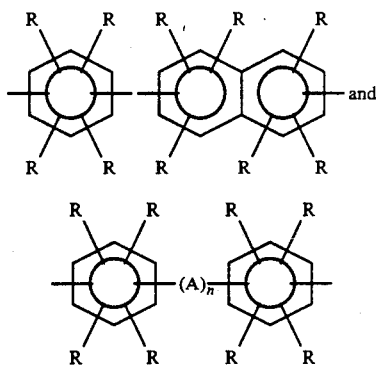

where n is 0 or 1, preferably 0; A is selected from the group consisting of oxygen, sulfur, sulfonyl, and $CR_2$; and each R is independently selected from the group consisting of hydrogen and an alkyl radical having 1 to 4 carbon atoms, the total number of carbon atoms in all the R groups in the molecule being 0 to 12.

Examples of suitable dihaloaromatic sulfones that can be employed in the preparation of the poly(arylene sulfide)/poly(arylene sulfide sulfone) block copolymer include bis(p-fluorophenyl)sulfone; bis(p-chlorophenyl)sulfone; bis(p-bromophenyl)sulfone; bis(p-iodophenyl)sulfone; p-chlorophenyl p-bromophenylsulfone; p-iodophenyl 3-methyl-4-fluorophenyl sulfone; bis(2-methyl-4-chlorophenyl)sulfone; bis(2,5-diethyl-4-bromophenyl)sulfone; bis(3-isopropyl-4-iodopbenyl)sulfone; bis(2,5-dipropyl-4-chlorophenyl)sulfone; bis(2-butyl-4-fluorophenyl)sulfone; bis(2,3,5,6-tetramethyl-4-chlorophenyl)sulfone; 2-isobutyl-4-chlorophenyl 3'-butyl-4'-bromophenyl sulfone; 1,4-bis(p-chlorophenylsulfonyl)benzene; 1-methyl-2,4-bis(p-fluorophenylsulfonyl)benzene; 2,6-bis(p-bromophenylsulfonyl)naphthalene, 7-ethyl-1,5-bis(p-iodophenylsulfonyl)naphthalene; 4,4'-bis(p-chlorophenylsulfonyl)biphenyl; bis[p-(p-bromophenylsulfonyl)phenyl]ether; bis[p-(p-chlorophenylsulfonyl)phenyl]sulfide; bis[p-(p-chlorophenylsulfonyl)phenyl]sulfone; bis[p-(p-bromophenylsulfonyl)phenyl]methane; 5,5-bis[3-ethyl-4-(p-chlorophenylsulfonyl)phenyl]nonane, and the like, and mixtures thereof. The presently preferred dihaloaromatic sulfones are dichloroaromatic sulfones, and bis(p-chlorophenyl)sulfone is most preferred.

Generally, in preparing the block copolymer, the amount of dihaloaromatic sulfone employed is in the range of 0.7 to 2.0 moles per mole of sulfur source and preferably from 0.9 to 1.3. The amount of dihaloaromatic sulfone relative to the poly(arylene sulfide) prepolymer can vary widely, depending on the characteristics desired in the final block copolymer. Generally, the amount of dihaloaromatic sulfone is in the range of from about 0.01 to about 100 moles of dihaloaromatic sulfone per mole poly(arylene sulfide) prepolymer, preferably from 0.1 to 10.

Sulfur sources which can be employed in the preparation of the poly(arylene sulfide)/poly(arylene sulfide sulfone) block copolymer are those described above in the preparation of the poly(arylene sulfide) prepolymer. The sulfur source can be the same or different from the sulfur source employed in preparing the prepolymer. The preferred sulfur sources are sodium sulfide or sodium hydrosulfide.

The polar organic compounds used in preparing the poly(arylene sulfide)/poly(arylene sulfide sulfone) block copolymers are those described above in the preparation of the poly(arylene sulfide) prepolymer. The polar organic compounds can be the same or different from those employed in preparing the prepolymer. Amides are preferred, and N-methyl-2-pyrrolidone is especially preferred.

The moles of polar organic compound per mole of sulfur source can vary broadly, generally from about 1 to about 24, preferably from 2 to 16, and most preferably from 2 to 12.

Optionally an alkali metal carboxylate can be employed in the preparation of the block copolymer. Usage of an alkali metal carboxylate generally results in a copolymer of higher molecular weight than copolymer prepared in the absence of alkali metal carboxylate.

Alkali metal carboxylates that can be employed in the preparation of the block copolymer can be the same or different from those in the prepolymerization step. The presently preferred alkali metal carboxylate is sodium acetate because of its effectiveness and commercial availability.

The moles of alkali metal carboxylate per mole of sulfur source can vary broadly, generally in the range of from about 0.05 to about 4, preferably from about 0.1 to about 2, and most preferably from 0.15 to 1.5.

Although the reaction temperature at which the copolymerization is conducted can vary over a considerable range, generally it will be within the range of about 150° C. to about 300° C., preferably 175° C. to 250° C. The reaction time can vary widely, depending in part on the reaction temperature, but generally will be within the range of from about 10 minutes to about 72 hours, preferably from 1 hour to 8 hours. The pressure will generally be within the range of about 0 psig to about 300 psig (0–2.1 MPa), preferably 100 psig to about 250 psig (0.7–1.7 MPa).

The block copolymer can be separated from their reaction mixture in any manner known to those of ordinary skill in the art. One suitable method employs the addition of a separation agent, such as water, in order to separate the block copolymer from the polar organic compound and non-polymeric liquid components and unconsumed reactants. The block copolymer can then be washed with water and optionally water-miscible solvents such as acetone or methanol in order to remove impurities and by-product salts. If desired, at least a portion of the washing can be conducted at an elevated temperature, for example up to about 200° C.

The final recovered poly(arylene sulfide)/poly(arylene sulfide sulfone) block copolymer can optionally have other ingredients incorporated including extenders, fillers, pigments, plasticizers, stabilizers etc. In certain applications, it may be desirable to add additional strength to the polymer. Polymer strength can be increased by incorporating strengtheners such as fibers into the block copolymer to form a composite material. Preferred strengtheners, due to their effectiveness, are inorganic fibers such as asbestos, glass and carbon and the like. Block copolymer produced by the process of the invention are useful in the production of coatings, film, molded objects, and fibers, as well as compatibilizer in polymer blends.

The following example will serve to show the present invention in detail by way of illustration and not by way of limitation.

EXAMPLE

The following example demonstrates the preparation and properties of various block copolymers.

Table 1 demonstrates that various phenolic compounds can be employed to produce PPS/PPSS block copolymers. The fact that the copolymers exhibit two glass transition temperatures indicates the presence of the two blocks, PPS and PPSS.

Table 2 demonstrates the mechanical properties of the block copolymer prepared according to the present invention.

The prepolymer used to prepare the block copolymer of Run 101, was prepared by charging a stainless steel autoclave with 1586.14 g N-methyl-2-pyrrolidone (4.00 moles NMP); 498.41 g NASH as a 44.090 wt. % aqueous solution (3.92 moles); 166.39 g NAOH (4.16 moles); 353.34 g water (19.63 moles) total from neutralization and NASH; 321.58 g NaOAc (3.92 moles); and 20.02 g bisphenolsulfone (0.080 moles BPS). The autoclave was sealed and purged four times with nitrogen. The mixture was dehydrated by raising the autoclave temperature to 200° C., the vent tube was opened, and a slow flow of nitrogen was passed through the autoclave for 1 hour and 264.9 g water were removed leaving 85.20 g remaining. After the dehydration was complete, 588.0 g dichlorobenzene (4.00 moles DCB) and 1586.2 g additional NMP were charged to the autoclave. The autoclave was heated to 235° C. and held for 1 hour and then heated to 265° C. and held for 15 minutes. The autoclave was cooled and the thus produced prepolymer was soaked in 2 liters deionized water overnight. The prepolymer was washed in hot deionized water and then with hot 3% acetic acid. The prepolymer was then dried overnight in a vacuum oven at 125° C. and 12" mercury. Prepolymer was recovered to give a yield of 385 g or 85%. The extrusion rate was 65 g/10 min., measured at 315° C. using a 2 kg weight and 1.220" long orifice. The molecular weight from gel permeation chromatography (GPC) was 21,500.

The prepolymer employed to prepare the block copolymer of Run 102 was prepared in the manner described above and employing 3.00 moles NaSH; 3.06 moles NAOH; about 60 g water after dehydration; 3.00 moles NaOAc; 24 moles NMP; 13.96 g 4-chloro-4'-hydroxybenzophenone (0.060 moles CHBP); and 2.94 moles DCB. Prepolymer was recovered to give a yield of 278 g or 84%. The extrusion rate was 523 g/10 min., measured at 315° C. using a 2 kg weight. The molecular weight from GPC was 12,900.

The prepolymer employed to prepare the block copolymer of Run 103, was prepared in the manner described above and employing 2.94 moles NaSH; 3.00 moles NAOH; about 70 g water after dehydration; 2.94 moles NaOAc; 24 moles NMP; 13.25 g 4,4'-dihydroxybenzophenone (0.060 moles DHBP); and 2.94 moles DCB. Prepolymer was recovered to give a yield of 276 g or 83%. The extrusion rate was 52 g/10 min., measured at 315° C. using a 2 kg weight. The molecular weight from GPC was 29,000.

PPS/PPSS block copolymer was prepared from each prepolymer, Runs 101-103, by charging a stainless steel stirred autoclave with 2379.20 g NMP (24 moles); 574.32 g bis(4-chlorophenyl)sulfone (2.00 moles BCPS); 254.29 g NASH as a 44.090 wt. % aqueous mixture (2.00 moles); 80.30 g NAOH (2.008 moles); 164.07 g NaOAc (2.00 moles); and 216.32 g PPS prepolymer (2.02 moles). The reactor was sealed and purged four times with nitrogen. The autoclave temperature was raised to 200° C. and held for 3 hours. The autoclave was cooled and the thus produced block copolymer was blended with 2 liters deionized water in a Waring blender. Each block copolymer was sequentially washed in hot deionized water, 3 wt. % acetic acid, and then zinc acetate. Each block copolymer was then dried overnight in a vacuum oven at 125° C. and 12" mercury. The yield ranged from 84 to 99%. The melt flow in Table 1 reported as g/10 min. was measured at 315° C. using a 5 kg weight and 0.315" long orifice according to ASTM D 1238.

Thermal transitions were measured employing a Perkin-Elmer DSC-2C differential scanning calorimeter equipped with a computerized data system and a Perkin-Elmer TADS-1 plotter. The polymer sample was heated at a rate of 20° C./minute. In Table 1, Tg is the glass transition temperature in °C. Tcc is the cold crystallization temperature in °C. Tmc is the melt crystallization temperature (upon cooling of the melt at 20° C./minute) in °C. Tm is the melt temperature in °C.

Thermal transitions of the various block copolymers prepared are indicated in Table 1.

TABLE 1

| Run | Phenolic Compound | MF g/10 min | Tg °C. | Tg °C. | Tcc °C. | Tmc °C. | Tm °C. |
|---|---|---|---|---|---|---|---|
| 101 | 0.08M BPS | 69 | 91 | 215 | 129 | 234 | 280 |
| 102 | 0.06M CHBP | 165 | 83 | 191 | 123 | 237 | 265 |
| 103 | 0.06M DHBP | 90 | 89 | 210 | 133 | 235 | 279 |

The results in Table 1 demonstrate that a block copolymer was prepared by contacting a poly(phenylene sulfide) prepolymer with bis(4-chlorophenyl)sulfone, wherein the prepolymer was prepared in the presence of a phenolic compound. The block copolymers thus prepared exhibit two glass transition temperatures indicating the presence of both PPS and PPSS blocks.

Seven batches of block copolymer prepared as described above for Run 101, were thoroughly dry blended together. The blended block copolymer, 6765 g, was melt stabilized by washing with an aqueous solution of 3% zinc acetate by weight at 180° C. for 30 minutes and then with deionized water at 100° C. for 1 hour. The washed block copolymer was recovered, 4572 g, and exhibited a melt flow of 110 g/10 min. A portion of the material described above was annealed at 200° C. for 2 hours, designated "Annealed" in Table 2. Mechanical properties were measured for both the annealed and unannealed block copolymer. Flexural strength was measured according to ASTM D-790 and reported as both kpsi (kilo-pounds per square inch) and kg/cm². The Izod impact strength was measured according to ASTM D-256 and reported as ft•lb/in and kg•cm/cm.

Table 2 represents the mechanical properties of block copolymers prepared as described above.

TABLE 2

| Resin | Unannealed | Annealed |
|---|---|---|
| Flexural Strength | | |
| kpsi | 17.6 | 16.2 |
| kg/cm² | 1237 | 1139 |
| Izod Impact, Unnotched | | |
| ft · lb/in | 11.3 | 6.9 |
| kg · cm/cm | 61.6 | 37.6 |

While this invention bas been described in detail for the purpose of illustration, it is not to be construed as That which is claimed is:

1. A process for preparing poly(arylene sulfide)/poly(arylene sulfide sulfone) block copolymer comprising:
   (1) contacting a dihaloaromatic compound, a phenolic compound, a polar organic compound, and a sulfur source under polymerization conditions to produce a poly(arylene sulfide) prepolymer;
   wherein said dihaloaromatic compound is represented by the formula

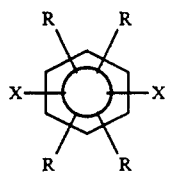

where each X is selected from the group consisting of fluorine, chlorine, bromine, and iodine and where each R is independently selected from the group consisting of hydrogen and a hydrocarbyl radical., the total number of carbon atoms in each molecule being within the range of 6 to 24; said phenolic compound is represented by the formula

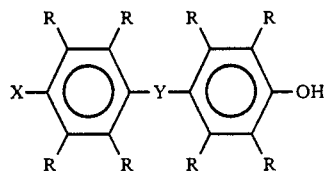

where Y is selected from the group consisting of —SO$_2$— and —CO—, where X is selected from the group consisting of hydroxyl, chlorine, bromine, fluorine, and iodine, and where each R is independently selected from the group consisting of hydrogen and a hydrocarbyl radical, the total number of carbon atoms in each molecule being within the range of 12 to 24;
   (2) contacting said poly(arylene sulfide) prepolymer, a dihaloaromatic sulfone, a sulfur source, and a polar organic compound under polymerization conditions;
   where said dibaloaromatic sulfone is represented by the formula

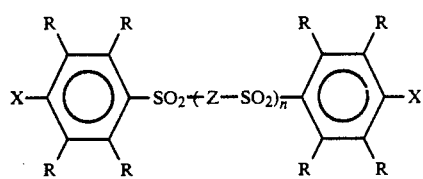

where n is 0 or 1, each X is independently selected from the group consisting of fluorine, chlorine, bromine, and iodine, where each R is independently selected from the group consisting of hydrogen and an alkyl radical having 1 to 4 carbon atoms, and where Z is a divalent radical selected from the group consisting of

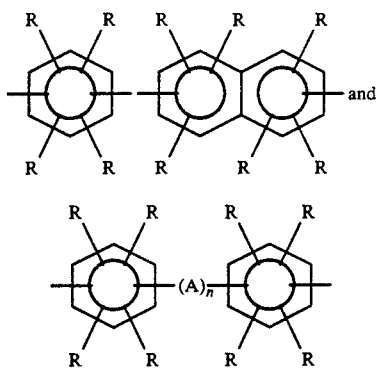

where n is 0 or 1, A is selected from the group consisting of oxygen, sulfur, sulfonyl, and CR$_2$, and where each R is independently selected from the group consisting of hydrogen and an alkyl radical having 1 to 4 carbon atoms, the total number of carbon atoms in all the R groups in the molecule being 0 to 12; and
   wherein each said sulfur source is independently selected from the group consisting of an alkali metal sulfide and an alkali metal hydrosulfide.

2. A process according to claim 1 wherein said phenolic compound is selected from bisphenolsulfone, 4-chloro-4'-hydroxydiphenylsulfone, 4,4'-dihydroxybenzophenone, 4-chloro-4'-hydroxybenzophenone, and mixtures thereof.

3. A process according to claim 1 wherein said dihaloaromatic compound is a p-dihalobenzene.

4. A process according to claim 3 wherein said dihaloaromatic compound is p-dichlorobenzene.

5. A process according to claim 1 wherein said dihaloaromatic sulfone is a dichloroaromatic sulfone.

6. A process according to claim 5 wherein said dihaloaromatic sulfone is bis(p-chlorophenyl)sulfone.

7. A process according to claim 1 wherein each said sulfur source is sodium sulfide or sodium hydrosulfide.

8. A process according to claim 1 wherein each said polar organic compound is an organic amide.

9. A process according to claim 8 wherein each said polar organic compound is N-methyl-2-pyrrolidone.

10. A process according to claim 1 wherein said polymerization conditions for preparing said poly(arylene sulfide) prepolymer include a temperature within the range of from about 150° C. to about 350° C. and
    the polymerization conditions for preparing said block copolymer include a temperature within the range of from about 150° C. to about 300° C.

11. A process according to claim 10 wherein said polymerization conditions for preparing said poly(arylene sulfide) prepolymer include a temperature within the range of from 175° C. to 275° C. and
    the polymerization conditions for preparing said block copolymer include a temperature within the range of from 175° C. to 250° C.

12. A process according to claim 1 further comprising contacting an alkali metal carboxylate in step (1).

13. A process according to claim 1 further comprising contacting an alkali metal carboxylate in step (2).

14. A block copolymer produced according to the process of claim 1.

15. A process for preparing poly(arylene sulfide)/poly(arylene sulfide sulfone) block copolymer comprising:

(1) contacting p-dichlorobenzene, a phenolic compound, sodium hydrosulfide, and N-methyl-2-pyrrolidone under polymerization conditions to produce a poly(phenylene sulfide) prepolymer;
wherein said phenolic compound is selected from the group bispbenolsulfone, 4-chloro-4'-hydroxydiphenylsulfone, 4,4'-dihydroxybenzopbenone, 4-chloro-4'-hydroxybenzophenone, and mixtures thereof;
(2) contacting said poly(phenylene sulfide) prepolymer, bis(p-chloropbenyl)sulfone, sodium hydrosulfide, and N-methyl-2-pyrrolidone under polymerization conditions to produce said block copolymer.

16. A process according to claim 15 wherein said polymerization conditions for preparing said poly(phenylene sulfide) prepolymer include a temperature within the range of from about 150° C. to about 350° C. and for a time of about 10 minutes to about 72 hours; and
the polymerization conditions for preparing said block copolymer include a temperature within the range of from about 150° C. to about 300° C. and for a time of about 10 minutes to about 72 hours.

17. A process according to claim 16 wherein said polymerization conditions for preparing said poly(phenylene sulfide) prepolymer include a temperature within the range of from 175° C. to 275° C. and for a time of 1 hour to 8 hours; and
the polymerization conditions for preparing said block copolymer include a temperature within the range of from 175° C. to 250° C. and for a time of 1 hour to 8 hours.

18. A block copolymer produced according to the process of claim 15.

19. A process according to claim 2 wherein said phenolic compound is 4-chloro-4'-hydroxydiphenylsulfone, 4-chloro-4'-hydroxybenzophenone, or mixtures thereof.

20. A process according to claim 15 wherein said phenolic compound is 4-chloro-4'-hydroxydiphenylsulfone, 4-chloro-4'-hydroxybenzophenone, or mixtures thereof.

* * * * *

UNITED STATES PATENT AND TRADEMARK OFFICE
CERTIFICATE OF CORRECTION

PATENT NO. : 5,286,817
DATED : February 15, 1994
INVENTOR(S) : Dwayne R. Senn and Carlton E. Ash It is certified that error appears in the above-identified patent and that said Letters Patent is hereby corrected as shown below:

Column 9, claim 1, line 26, delete "." after "radical"; line 51, delete "dibaloaromatic" and insert --- dihaloaromatic --- therefor.

Column 11, claim 15, line 6, delete "bispbenolsulfone" and insert --- bisphenolsulfone ---; line 7, delete "4,4'-dihydroxybenzopbenone" and insert --- 4,4'-dihydroxybenzophenone ---; line 11, delete "bis(p-chloropbenyl)sulfone and insert --- bis(p-chlorophenyl)sulfone --- therefor.

Signed and Sealed this

Ninth Day of August, 1994

BRUCE LEHMAN

Attest:

Attesting Officer

Commissioner of Patents and Trademarks